July 18, 1933.   J. A. BOMBARD ET AL   1,918,630
AUTOMOBILE VENTILATOR
Filed Sept. 8, 1930    3 Sheets-Sheet 1
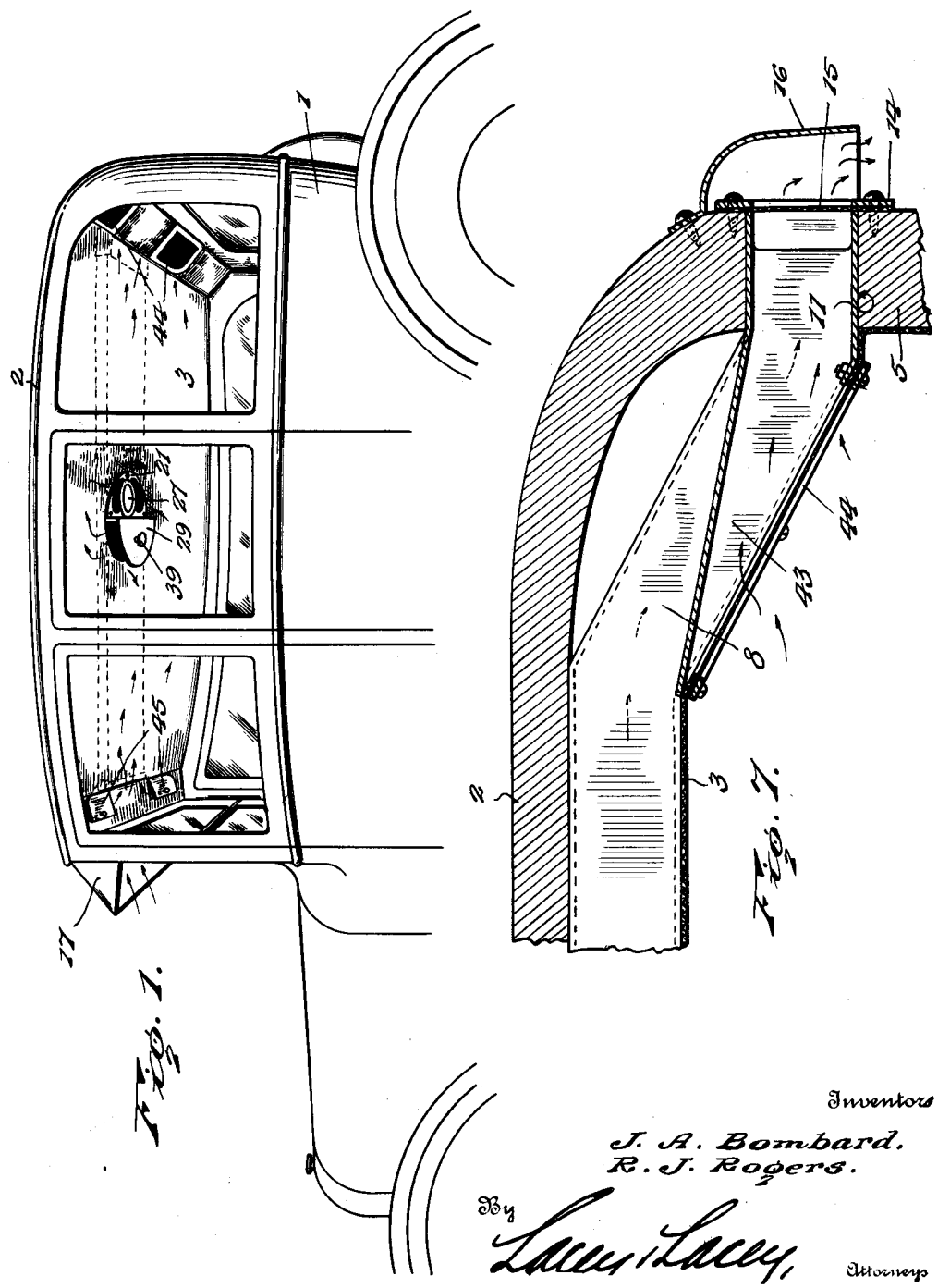
Inventors
J. A. Bombard.
R. J. Rogers.
By Lacey & Lacey,
Attorneys

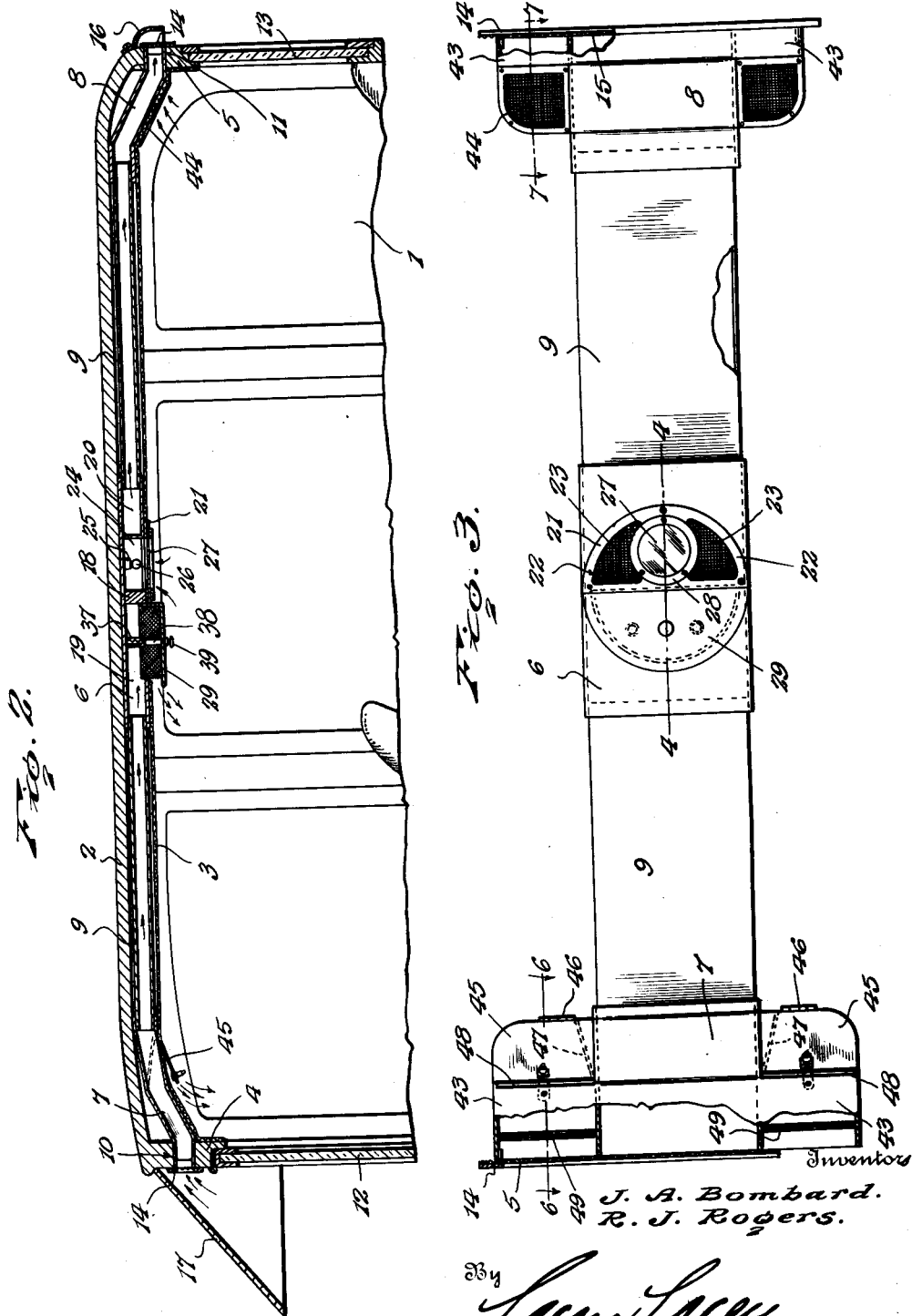

July 18, 1933.　　J. A. BOMBARD ET AL　　1,918,630
AUTOMOBILE VENTILATOR
Filed Sept. 8, 1930　　3 Sheets-Sheet 3
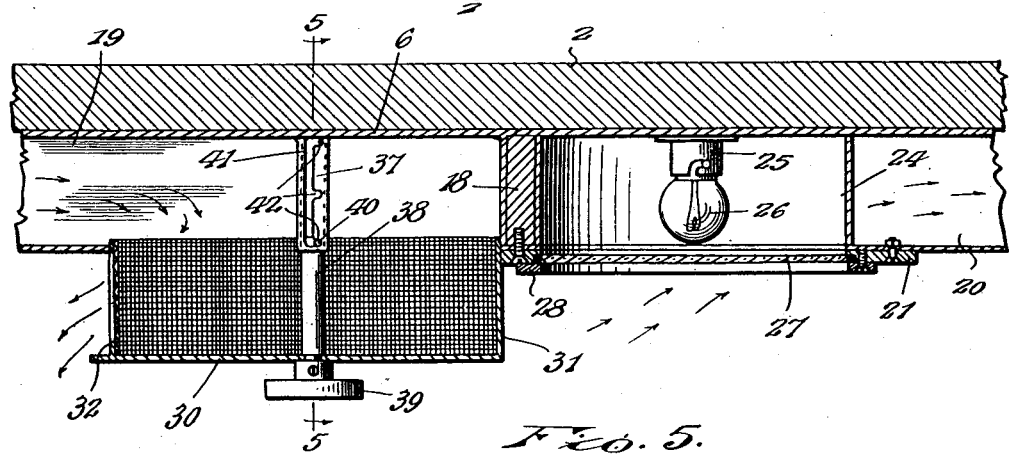
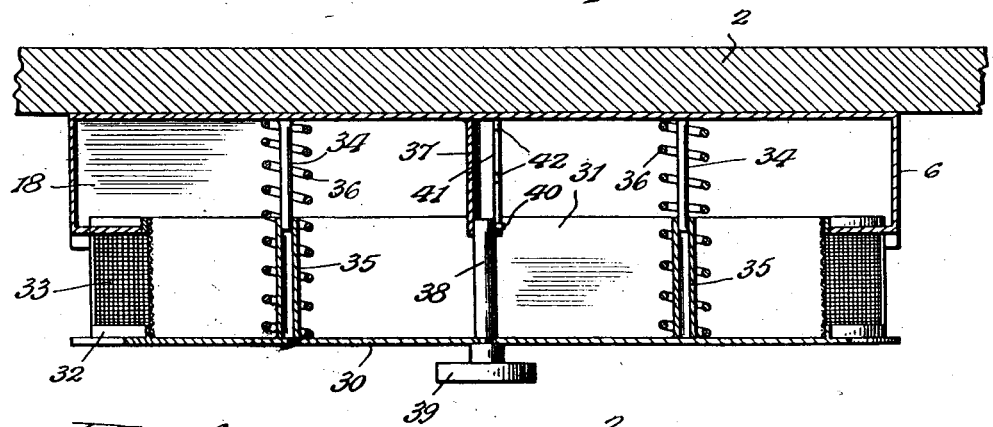
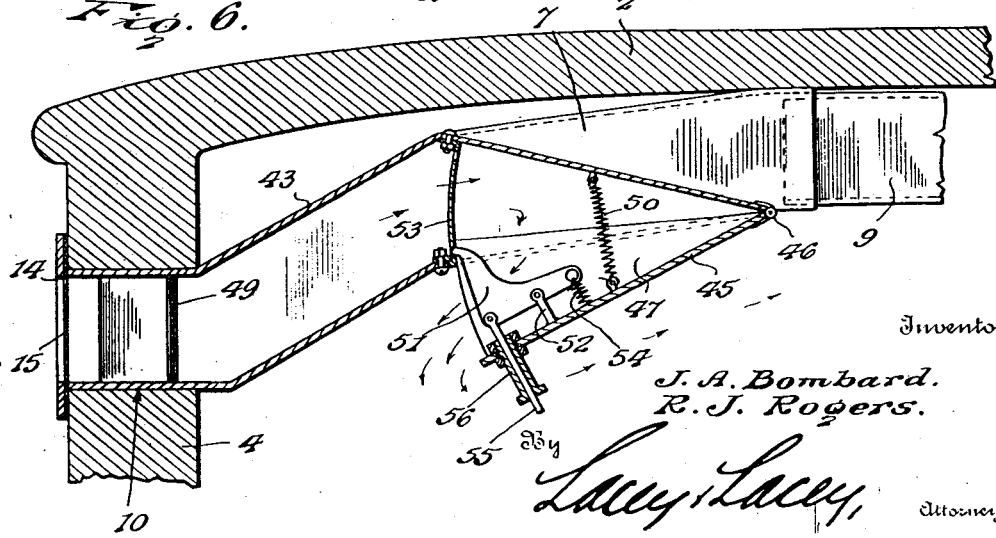
Inventor
J. A. Bombard.
R. J. Rogers.
By Lacey & Lacey,
Attorney Patented July 18, 1933

1,918,630

UNITED STATES PATENT OFFICE

JOSEPH AUGUSTIN BOMBARD AND ROLAND JAMES ROGERS, OF SARANAC LAKE, NEW YORK

AUTOMOBILE VENTILATOR

Application filed September 8, 1930. Serial No. 480,566.

This invention relates to ventilators and more particularly to a ventilator adapted to be installed in an automobile or other fast moving vehicle and which serves to permit fresh air to be forced into the vehicle and warm air sucked out of the vehicle when the vehicle is in motion.

The ventilator constituting the subject-matter of this invention is an improvement over the ventilator disclosed in our copending application, Serial No. 411,631, filed December 4, 1929, No. 1,820,430.

One object of the invention is to provide a ventilator which can be installed in the top of an automobile body where it will be concealed from view except its portions through which air passes into and out of the automobile body and further to so construct the ventilator that it may be readily applied to an automobile body of a conventional construction without making structural changes therein.

Another object of the invention is to so form the ventilator that a portion thereof may serve not only as an air passage but also has a housing for a top light and thereby allow this portion of the ventilator to serve a double function.

Another object of the invention is to provide the ventilator with end portions of such construction that they will be disposed at a downward incline and conform to the shape of the automobile top. By this arrangement the ventilator will not detract from the appearance of the automobile and at the same time air passages in these end portions will be disposed in such positions that air may very easily pass through them.

Another object of the invention is to provide a ventilator of such construction that air may enter the automobile at the front and intermediate its length and pass out of the automobile at its center and near its rear end, thereby causing all portions of the automobile to be well ventilated.

Another object of the invention is to provide the ventilator with closures for certain of its air passages which are located within the automobile where they may be easily reached by occupants thereof and opened or closed.

The invention is illustrated in the accompanying drawings, wherein

Figure 1 is a perspective view of an automobile equipped with the improved ventilator, Fig. 2 is a longitudinal sectional view through the upper portion of an automobile body equipped with the improved ventilator,

Fig. 3 is a bottom plan view of the improved ventilator with portions shown in section, Fig. 4 is an enlarged longitudinal sectional view taken on the line 4—4 of Fig. 3,

Fig. 5 is a transverse sectional view taken on the line 5—5 of Fig. 4,

Fig. 6 is a sectional view taken on the line 6—6 of Fig. 3, and

Fig. 7 is a sectional view taken on the line 7—7 of Fig. 3.

The ventilator is to be applied to an automobile of the closed type, indicated in general by the numeral 1, and when in place occupies space between the top 2 and the lining 3, as shown in Figures 1 and 2. Therefore, the ventilator will be hidden from view, except portions thereof through which air is to pass into and out of the automobile and consequently will not detract from the appearance of the automobile. It should also be noted that by mounting the ventilator in this manner there will be no danger of a person being injured by striking the ventilator when getting into or out of an automobile.

The ventilator consists of a hollow elongated body of sufficient length to extend longitudinally in the automobile between front and rear walls 4 and 5 thereof, and by referring to Figure 3 it will be seen that the ventilator has an intermediate section 6 joined to front and rear end sections 7 and 8 by conduits or connecting sections 9. The connecting sections or conduits 9 have their ends in telescoping engagement with the intermediate section and end sections, thereby permitting the ventilator to be easily installed with the intermediate section firmly secured against the top of the automobile body and the end sections engaged in openings 10 and 11 formed through the front and rear walls above the windshield 12 and rear window 13. Frames 14 carrying screenings 15 are secured against the outer faces of the front and rear walls about the openings through which the end sections of the ventilator are engaged in order to prevent dust and insects from passing through the ventilator into the automobile and since a hood 16 is secured to the rear wall and the opening in the front wall is located beneath the sun shield 17, there will be no danger of rain or snow driving into the ventilator through its ends.

The intermediate section 6 is formed of sheet metal or any other material found suitable and has its bottom or lower wall formed intermediate its ends with a large opening bisected by a partition 18 extending transversely of this section for the entire width thereof and dividing it into front and rear chambers 19 and 20 with which the conduits 9 communicate. A frame 21 is secured against the under face of the bottom or lower wall about the rear portion of the opening formed therein and this frame has side openings 22 shielded by screening 23 and an intermediate opening which registers with a lamp housing 24 in which is located a lamp socket 25 secured to the top or upper wall of the conduit section and carries a bulb 26 by means of which the interior of the automobile may be lighted. This lamp housing has its open lower end closed by a lens 27 and in order to secure the lens there has been provided a ring 28 removably secured to the frame 22 by screws or equivalent fasteners. By this arrangement air may pass from the interior of the automobile through the openings 22 at opposite sides of the lamp housing into the rear compartment 20 and rearwardly through the ventilator. It will be understood that, when the automobile is in motion, suction will be created to draw the air out of the automobile.

The forward portion of the opening in the bottom of the intermediate ventilator section is provided with a closure 29 consisting of a head 30 and walls extending therefrom and slidably received in the opening. The head 30 conforms to the outline of the opening but is of greater dimensions so that marginal portions of the head may bear against the under face of the conduit section and limit closing movement thereof. The wall 31 which bears against the partition 18 is solid but the walls 32 about the sides and forward portion of the closure are open and shielded by screening 33. Therefore, air may pass freely into the automobile when the closure is open and dust or insects will be excluded and prevented from entering the automobile. It should be noted that since the wall 31 is solid air passing inwardly through the compartment 19 into the automobile will be deflected by this solid wall and directed towards the front and sides of the automobile. By this arrangement the incoming air will be directed away from the outlet openings 22 immediately to the rear of the closure 29 and the fresh air prevented from being immediately sucked out of the automobile through the outlets. In order to guide the vertical movement of the closure into and out of a closed position, there has been provided stems 34 which are slidably received in sleeves 35 carried by the head 30 and about these stems and sleeves are disposed springs 36 which urge the closure towards an opened position. A hollow post 37 extends downwardly from the top of the conduit and slidably receives a stem or latch 38 which is rotatably engaged through the head of the closure and carries a knob 39. This stem carries a pin or tooth 40 slidable longitudinally in a slot 41 formed in the hollow post and intermediate its length the slot is formed with recesses or seats 42 into which the tooth may be engaged by turning the stem. From an inspection of Figures 4 and 5, it will be readily seen that by grasping the knob 39 the stem or latch may be rotated to move the tooth out of a recess 42 and the closure can then be moved towards a closed or opened position and the knob then turned to engage the tooth in another recess and securely but releasably hold the closure in an adjusted position. When the closure is being moved towards a closed position, pressure must be exerted in order to compress the springs 34 but when it is being opened the pressure of the springs will urge the closure downwardly and greatly facilitate the ease with which it may be opened. The pressure of the springs will also retain the tooth in the side notch or recess 42 in which it is engaged and prevent vibration causing the tooth to accidentally slip out of the desired seat.

The front and rear sections 7 and 8 have their inner and outer portions extending substantially horizontally in order that they may have engagement with the conduits 9 and fit into the openings 10 and 11 formed in the front and rear walls of the automobile and their intermediate portions extend at a downward incline in order that these end sections may fit properly in the front and rear portions of the automobile, as shown in Figure 2. These front and rear end sections have side extensions 43 which are open at their inner and outer ends and constitute auxiliary air chambers or passages and the screens 15 carried by the frames 14 serve to guard the outer ends of these auxiliary air passages or chambers as well as the ends of the main conduit. The inner ends of the side chambers of the rear section are covered by screens 44 and the inner ends of the side extensions of the front section are provided with closures 45 which are hingedly mounted at their rear ends, as shown at 46. Since the inner ends of the side extensions of the rear section are cut at an incline, the screens 44 will extend rearwardly at a downward incline, as clearly shown in Figures 1 and 7, and warm air in the automobile can be very easily sucked out of the same through the auxiliary air passages. By having the closures 45 hinged at their rear edges they will extend forwardly at a downward incline when opened, as shown in Figure 6, and air passing inwardly through the auxiliary air passages or chambers of the front section will be deflected towards the front of the automobile, as indicated by the dotted lines in Figures 2 and 6. Each of the closures 45 has side walls 47 which engage side edges of the openings 48 in order to cause the air passing into the automobile though these openings to be directed forwardly but since each closure has only a side wall along its inner side as shown in Figure 3 and these walls converge toward the front of the automobile the incoming air will be directed forwardly and also towards sides of the automobile. It will thus be seen that the front portion of the automobile will be supplied with fresh air for its full width and warm air will be prevented from accumulating at the front. Screens 49 are mounted in the auxiliary chambers of the front end section in order to prevent dust and insects from passing through these auxiliary air passages in case they should not be stopped by the main screen secured against the front wall of the automobile. A spring 50 yieldably holds each closure 45 in a closed position and in order to secure the closure in a partially or fully opened position, each closure is provided with a latch 51 pivoted upon a fulcrum 52 and urged into position to engage in openings formed in a strip 53 by a spring 54. The actuating stem 55 of the latch extends through a knob 56 by means of which the closure is moved to an open position.

When the ventilator is in use, it is mounted in the upper portion of the automobile body between the top thereof and the lining and occupies the position shown in Figures 1 and 2. By referring to these figures, it will be seen that when the automobile is in motion and moving forwardly air will pass into the ventilator through the front section 7 and its side extensions and this air will enter the car at the front and center when the closures 45 and 29 are open. Passage of air into the automobile may be controlled by adjusting the closures and if so desired certain of these closures may be opened and the remainder left closed. During cold weather all of the closures may be closed. As the automobile moves forwardly, a suction is created through the rear section and its side extensions and air will be drawn out of the automobile through the screens 44 and through the rear chamber of the intermediate ventilator section. In view of the fact that the ventilator is almost completely hidden by the lining, it will not detract from the appearance of the automobile and since a portion of the intermediate section constitutes a lamp housing it may take the place of the lamp housing usually provided in the top of an automobile at approximately the center thereof.

Having thus described the invention, I claim:

1. A ventilator for a vehicle comprising a tubular body of a length to extend longitudinally in a vehicle, said body being open at its end and divided intermediate its length to form front and rear sections, said sections having their inner ends formed with openings to communicate with a vehicle, and chambers at the sides of the outer ends of said sections having their outer ends open and their inner ends formed with openings to communicate with the interior of a vehicle.

2. A ventilator for a vehicle comprising a tubular body of a length to extend longitudinally in a vehicle, said body being open at its ends and divided intermediate its length to form front and rear sections, said sections having their inner ends formed with openings to communicate with a vehicle, chambers at the sides of the outer ends of said sections having their outer ends open and their inner ends formed with openings to communicate with the interior of a vehicle, and closures for the openings at the inner end of the front section and front side chambers movable into and out of closing relation thereto.

3. A ventilator for a vehicle comprising a tubular body of a length to extend longitudinally in a vehicle, said body being open at its ends and divided intermediate its length to form front and rear sections, said sections having their inner ends formed with openings to communicate with a vehicle, chambers at sides of the outer ends of said sections having their outer ends open and their inner ends formed with openings to communicate with the interior of a vehicle, a closure for the opening at the inner end of the front section slidable into and out of a closed position and having walls formed with air passages, and closures for the open inner ends of the side chambers of the front section pivoted for movement into and out of a closed position and when open extending forwardly at a downward incline to deflect incoming air forwardly.

4. A ventilator for a vehicle comprising a body of a length to extend longitudinally in a vehicle and having an intermediate section, end sections open at their ends, and conduits connecting the end sections with the intermediate section, the intermediate section being formed with an opening in its bottom wall, a partition dividing the intermediate section into front and rear compartments and bisecting the opening to form ports for the compartments, a closure for the front port having walls slidably received in the port, certain of the walls being perforated and one wall being solid and bearing against the partition, and means to releasably secure the closure in a set position.

5. A ventilator for a vehicle comprising a body of a length to extend longitudinally in a vehicle and having an intermediate section, end sections open at their ends, conduits connecting the end sections with the intermediate section, the intermediate section being formed with an opening in its bottom wall, a partition dividing the intermediate section into front and rear compartments and bisecting the opening to form independent ports for the compartments, one of said ports being always open and in communication with the interior of the vehicle, a closure for the other port having walls slidably received in said port, a head, a post, and a stem rotatably carried by said head and slidably and rotatably engaged with said post whereby the closure may be secured in a set position.

6. A ventilator for a vehicle comprising a body of a length to extend longitudinally in a vehicle and having an intermediate section, end sections open at their ends, and conduits connecting the end sections with the intermediate section, the intermediate section being divided into separate compartments each having an opening for communicating with the interior of the vehicle, the end sections having side extensions constituting auxiliary compartments, and each auxiliary compartment being open at its outer end and having its inner portion formed with an opening to communicate with the interior of the vehicle.

7. A ventilator for a vehicle comprising a body of a length to extend longitudinally in a vehicle and having an intermediate section, end sections open at their ends, and conduits connecting the end sections with the intermediate section, the intermediate section being divided into separate compartments each having an opening for communicating with the interior of the vehicle, the end sections having side extensions constituting auxiliary compartments and each auxiliary compartment being open at its outer end and having its inner portion formed with an opening in its bottom wall, and a closure for the inner opening of each front auxiliary compartment hinged at its rear edge and having side flanges to guide movement of the closure and direct air passing through the opening towards the front of the vehicle.

8. A ventilator for a vehicle comprising a body of a length to extend longitudinally in a vehicle and having an intermediate section, end sections open at their ends, and conduits connecting the end sections with the intermediate section, the intermediate section being divided into separate compartments each having an opening for communicating with the interior of the vehicle, the end sections having side extensions constituting auxiliary compartments and each auxiliary compartment being open at its outer end and having its inner portion formed with an opening in its bottom wall, a closure for the inner opening of each front auxiliary compartment hinged at its rear edge for movement into and out of a closed position, a strip in the auxiliary compartment formed with longitudinally spaced seats, and a latch carried by the closure and having a tooth to engage in the openings of the strip and releasably secure the closure in adjusted positions.

9. A ventilator for a vehicle comprising a body of a length to extend longitudinally in a vehicle adjacent the top thereof, said body having end portions extending at a downward incline and terminating in mouths to extend through openings formed in front and rear walls of a vehicle, said body being formed with front and rear air passages having their outer ends opening through ends of the body and their inner ends opening intermediate the length of the body, the end portions of the body being provided with side extensions constituting auxiliary air passages open at their inner and outer ends and having their open inner ends disposed in the plane of the inclined end portions of the body.

10. A ventilator for vehicles comprising a continuous elongated body adapted to be positioned within a vehicle near the top thereof, a transverse partition extending across the intermediate portion of the body to form front and rear air passages opening through the front and rear walls of the vehicle, the intermediate portion of the body on opposite sides of said partition being provided with independent ports, one of which is normally open and in communication with the interior of the vehicle and said rear air passage, and a closure for the other port adjustable to regulate the discharge of air from the front air passage through said port to the interior of said vehicle.

JOSEPH AUGUSTIN BOMBARD. [L. S.]
ROLAND JAMES ROGERS. [L. S.]